April 10, 1956  J. SMEDLEY  2,741,163
METHODS OF MACHINING AND APPARATUS THEREFOR
Filed Jan. 3, 1951  2 Sheets-Sheet 1
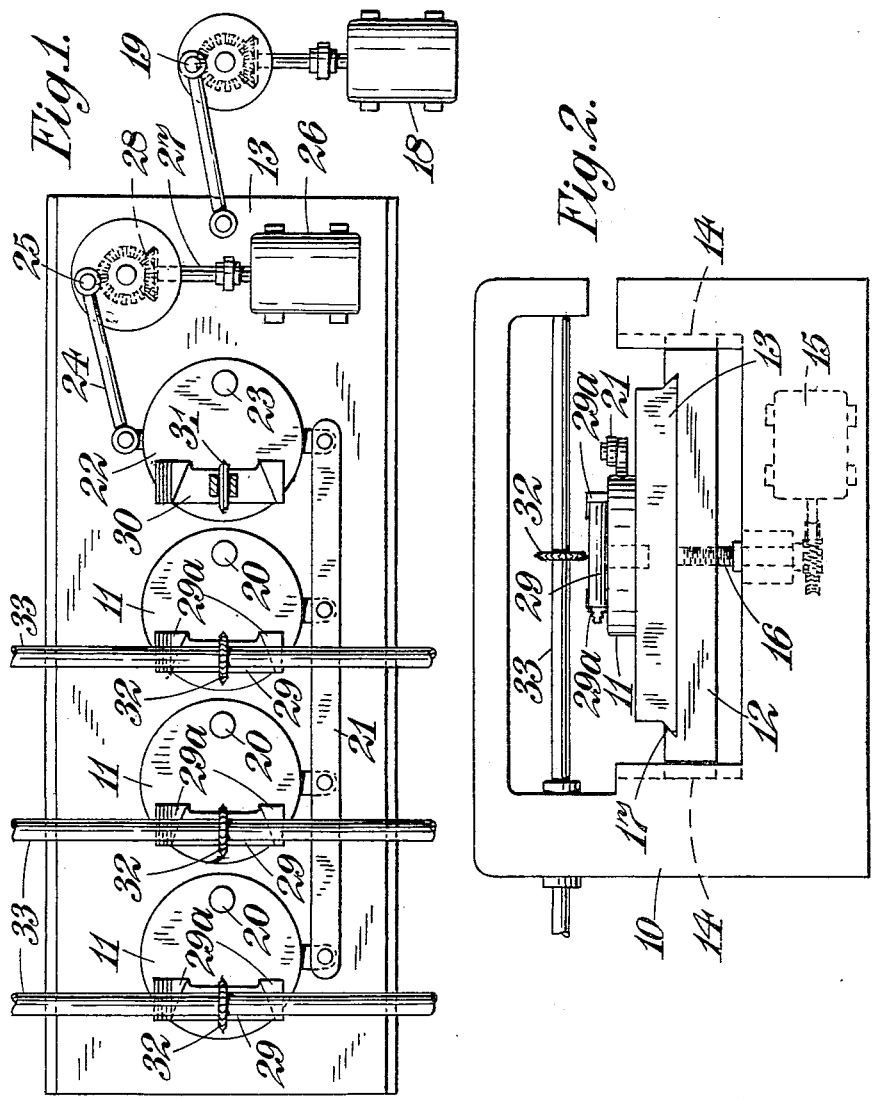
INVENTOR
JOHN SMEDLEY
By Wilkinson + Mawhinney
ATTYS.

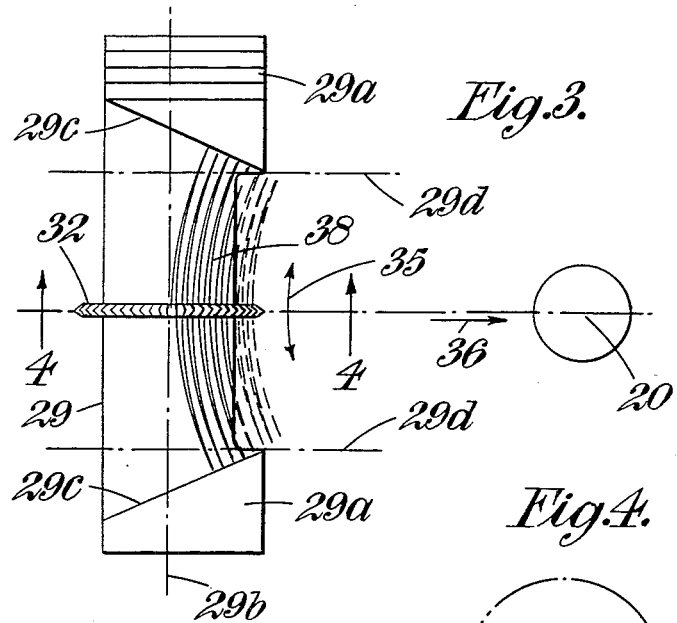
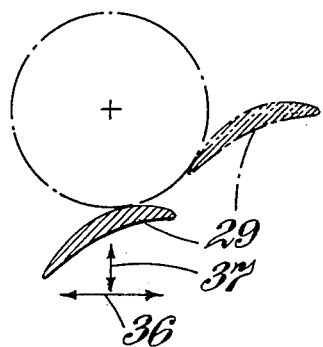
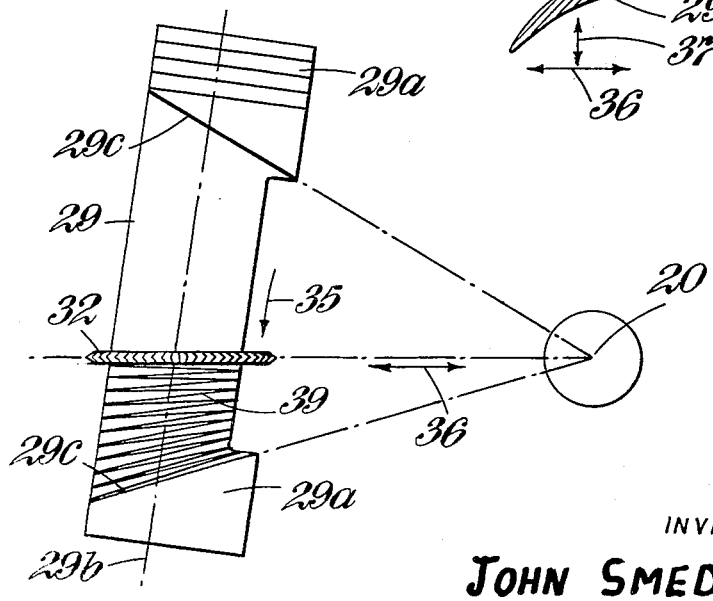

000# United States Patent Office 2,741,163
Patented Apr. 10, 1956

2,741,163

METHODS OF MACHINING AND APPARATUS THEREFOR

John Smedley, Chellaston, England, assignor to Rolls-Royce Limited, Derby, England, a British company Application January 3, 1951, Serial No. 204,133

Claims priority, application Great Britain January 11, 1950

3 Claims. (Cl. 90—13.4)

This invention relates to methods of machining and apparatus therefor, and is specifically concerned with methods and apparatus in which a master profile is copied by correlating the movement of a rotating cutting or grinding tool relative to a work-piece with the movements of a follower relative to a master profile.

The invention has an important application to methods of and apparatus for machining axial-flow turbine and compressor stator and rotor blading, in which a master profile is used for the repetition machining of such blading. The invention has for an object, the provision of methods and apparatus suitable for machining such blading having blade platforms at their root ends or at their tips or at both their root ends and tips, which platforms form when a series of blades are arranged in circumferential assembly, a substantially continuous shroud for the blade roots and/or tips. Such blading is commonly termed "shrouded blading."

In the design of such blading it is, in certain cases, desirable that the surface of the shroud from which the profiled portions of the blades project, should be in effect frusto-conical and coaxial with the axis of the circumferential assembly. Such a frusto-conical shroud arrangement results in the surface of each of the blade platforms from which the shroud is formed being inclined to a plane which is at right angles to spanwise axis of the associated profiled portion of the blading element. Such platforms will be referred to as "inclined platforms."

The machining of turbine and compressor blading has been carried out hitherto by methods involving the use of a profiling machine in which the relative movement of work-piece and cutting tool is correlated with the relative movement of a master profile and follower, and in which successive cuts by the cutting tool are made in planes at right angles to the spanwise axis of the blading element, the blading element being traversed with respect to the cutting tool parallel to the spanwise axis.

The adoption of such hitherto known methods of machining in the production of blading having inclined platforms results in the ends of the profiled portion of the blading element not being completely machined, so that a further machining step is necessary.

It is thus an important object of the present invention to provide a method of the machining of axial flow compressor and turbine stator and rotor blading having inclined platforms as mentioned above by which this further machining step is rendered unnecessary.

According to the invention, a method of machining axial flow turbine or compressor blading having inclined root blade-platforms or inclined tip blade-platforms or both, in which relative movement of a rotating disc-like tool and a blading blank is correlated with the relative movement of a master profile and follower, includes the steps of effecting a relative traverse between the blading blank and the disc-like tool by causing relative angular movement of the blading blank relatively to the tool about a swinging axis which is the line intersection of the planes of the surfaces of the root and tip blade platforms, the disc-like tool being arranged so that said swinging axis is, at all times during machining, contained in the plane of the disc-like tool.

It will be appreciated that the adoption of the invention permits the machining of the whole of the profile of blading elements with inclined platforms in a single operation, since the angular relative traverse of the blading blank and the tool is effected about an axis contained in the planes of both platform surfaces.

According to yet another feature of this invention, the method of machining may comprise the step of effecting a relative rectilinear traverse of the work-piece, for instance the blading blank, with respect to the tool in a direction which is at right angles to the swinging axis and is contained in the plane of rotation of the disc-like tool. The relative angular movement may be effected rapidly and alternately in opposite directions and said rectilinear traverse may be slow so that the surface of the work-piece is machined by a succession of cuts each of which is a substantially circular arc having its centre of curvature on said swinging axis, or alternatively the relative angular traverse may be a rapid reciprocation so that the surface of the work-piece is machined by a succession of cuts which are substantially radial to said swinging axis.

One embodiment of a machine tool suitable for machining compressor or turbine blades having both root and tip shroud platforms by the method of this invention will now be described with reference to the accompanying drawings in which—

Figure 1 is a diagrammatic plan view of the machine tool,

Figure 2 is a diagrammatic elevation of the machine tool,

Figure 3 illustrates one method of producing a blade in the machine tool illustrated in Figures 1 and 2, Figure 4 is a section on the line 4—4 of Figure 3, and Figure 5 illustrates a second method of producing a blade in the machine tool illustrated in Figures 1 and 2.

The machine tool comprises a frame structure 10 with a number of work carriers 11 mounted thereon through slides 12, 13. The slide 12 is engaged with guide 14 and is arranged for vertical adjustment by electric motor 15 and screw drive 16, and the slide 13 is engaged in guideways 17 in the slide 12 and can be moved backwards and forwards in the guides 17 by a drive indicated as comprising an electric motor 18 and a crank mechanism 19. The work carriers 11 are mounted on the slide 13 through pivots 20 to swing about vertical axes. The angular movements of the carriers 11 are arranged to be simultaneous and equal by coupling them together by link 21 which is also connected to a further carrier 22 which is identical with the carriers 11 and is similarly pivoted to slide 13 by a pivot 23. The swinging movements of the carriers 11 and 22 about their pivots is effected by connecting the carrier 22 by a link 24 to an eccentric pivot 25 which is rotated by a drive indicated as an electric motor 26, a shaft 27 and gearing 28.

Blading blanks 29 to be machined are mounted on the carriers 11 away from their swinging axes so that the planes of the inclined surfaces of the blade platforms 29a to be formed intersect on the swinging axes of the carriers 11.

The carrier 22 has mounted on it a master profile 30 which has the desired shape of the finished blades. The position of the master profile 30 relative to the axis of pivot 23 of carrier 22 is the same as the position of a blading blank 29 relative to the axis of its carrier 11. A follower 31 co-operates with the master profile 30 and the follower 31 is supported in the machine frame 10 for movement relative to the profile carrier 22 in a direction parallel to the axis of the pivot 23. The movements of the follower 31 parallel to the axis of pivot 23 are arranged by any suitable means to control the motor 15 so that the slide 12 moves vertically in a direction opposite to and by an amount equal to that of the follower which thereby tends to maintain a vertical datum position. The movements of the slide 12 may be effected by a hydraulic power servo device, by a mechanical linkage or by other means well known to the art.

Co-operating with the blade blanks 29 are milling cutters 32, one to each blank 29, and the cutters are mounted in the frame 10 in the same position relative to the blanks 29 as the follower 31 has to the master profile 30. The follower 31 is conveniently a disc having the same diameter as the cutters 32 and thus passage of the follower 31 over the master profile 30, say due to movements of slide 13 in its guides 17, will cause the cutters to reproduce the shape of the master profile 31 in the blanks 29. Each milling cutter 32 is mounted for rotation in a plane containing the axis of the pivot 20 of the respective carrier 11 and thus rotates about an axis lying parallel to the plane in which the carrier 11 swings.

From the above description, it will be seen that the cutter 32 and blading blank 29 move relative to one another in three senses, namely:

(a) Traverse substantially in the direction (indicated by arrow 35 Figures 3 and 5) of the spanwise axis 29b of the blading blank 29 due to the angular swinging movement of the carrier 11 about the axis of pivot 20.

(b) Traverse (indicated by arrow 36 Figures 3, 4, 5) due to movements of slide 13, which traverse is radial to the axis of pivot 20 and transversely of the spanwise axis 29b of the blading, and (c) Lift (indicated by arrow 37, Figure 4) i. e. vertical movement in a plane containing the axis of rotation of the carrier.

Since the movements (a) and (b), indicated by arrows 35, 36, are also imparted to the carrier 22 and thus to the master profile 30, and since the vertical movement (c) indicated by arrow 37 is controlled by the follower 31, the form of the master profile 30 is reproduced in the blanks 29.

With the machine tool above described, it is preferred to use a milling cutter 32 having side cutting edges, and to make successive cuts due to rapid angular swinging movement of the carriers 11, the slide 13 being moved slowly in its guides 17 so that the radial distance of the cutters 32 from the axes of pivots 20 is substantially constant for each cut. The trace of the cutter 32 on the blading blank 29 when the latter sweeps in direction of arrow 35 under the cutter 32 at a comparatively high relative speed and traverses slowly in the direction of arrow 36, is indicated at 38 (Figure 3) with an exaggerated spacing of successive cuts. Clearly, however, successive cuts may be obtained by comparatively rapid reciprocation of the slide 13 and slow swinging of the carriers on their pivots 20 so that the cutter trace on the blade is in this case represented by trace 39 (Figure 5).

Since the blank carriers 11 swing about axes which are the intersections of the planes 29c, of the surfaces of the blade end platforms 29a, the parts of the blank between each plane 29c and the adjacent plane 29d, which is at right angles to the spanwise axis 29b and contains inner edge of the platform portion 29a, can readily be machined at the same time as the mid-portion of the blade 29 which would not be the case if the traverse (a) were parallel to the spanwise axis 29b.

Thus a double shrouded blade with inclined platforms can be produced very simply, each surface of the blade profile only requiring a single shaping machining operation.

It will be appreciated that the invention is not limited to the construction of machine tool above described. Thus, it may be convenient in some machine tools to cause the cutters 32 to move under control of the follower 31 instead of moving the slides 12, 13 and carriers 11, 22.

Further, whilst the invention has been described as being applied in a machine tool in which the traverse transversely of the blade axis (movement b) is effected by movement of the slide 13, the cutters 32 may be moved each in a plane through the axis of the associated pivot 20 and parallel to the plane of the cutter. Alternatively the blading blanks 29 and the master profile 30 may be rotated in correlated manner about corresponding axes remote from and parallel to spanwise axes of the blading blank and master profile, thus to produce an equivalent traverse.

Instead of milling cutters 32, other forms of cutter or grinding element may be employed.

I claim:

1. A method of machining a workpiece to form a surface having an upstanding shoulder at each side thereof, the shoulders being at such an angle to each other that extensions thereof parallel to the surface will intersect, comprising relatively moving said workpiece and a rotating cutter along an arcuate path whose center is the aforesaid intersection, compounding said arcuate movement with a reciprocating movement in the plane of the cutter and along a line radial of said arcuate path to traverse the surface to be machined, said arcuate movement being relatively slow in relation to said linear movement whereby a succession of substantially radial cuts are made during said arcuate movement from the formation of one upstanding shoulder to the other whereby said arcuate movement at its extremes cooperates with said linear movement to cut the shoulders at the angle stated, and creating relative movement between said cutter and said surface at right angles to said surface to control the depth of cut and form the profile desired on said surface.

2. A method of machining a workpiece to form a surface having an upstanding shoulder at each side thereof, the shoulders being at such an angle to each other that extensions thereof parallel to the surface will intersect, comprising relatively moving said workpiece and a rotating cutter along an arcuate path whose center is the aforesaid intersection, compounding said arcuate movement with a reciprocating movement in the plane of the cutter and along a line radial of said arcuate path to traverse the surface to be machined, relating said relative movements so that one of said movements slowly traverses one dimension of said surface while the other movement is in the form of rapid reciprocations whereby a succession of cuts are made along the other dimension during movement along said one direction whereby the extremes of said arcuate movement cooperate with said linear movement to cut the shoulders at the angle stated, and creating relative movement between said cutter and said surface at right angles to said surface to control the depth of cut and form the profile desired on said surface.

3. A method of machining a workpiece to form a surface having an upstanding shoulder at each side thereof, the shoulders being at such an angle to each other that extensions thereof parallel to the surface will intersect, comprising relatively moving said workpiece and a rotating cutter along an arcuate path whose center is the aforesaid intersection, compounding said arcuate movement with a reciprocating movement in the plane of the cutter and along a line radial of said arcuate path to traverse the surface to be machined, said linear movement being relatively slow in relation to said arcuate movement whereby a succession of substantially arcuate cuts are made during said linear movement from the formation of one upstanding shoulder to the other whereby said arcuate movement at its extremes cooperates with said linear movement to cut the shoulders at the angle stated, and creating relative movement between said cutter and said surface at right angles to said surface to control the depth of cut and form the profile desired on said surface.

References Cited in the file of this patent

UNITED STATES PATENTS

| | | |
|---|---|---|
| 467,597 | Snow | Jan. 26, 1892 |
| 529,013 | Barnes | Nov. 13, 1894 |
| 560,871 | Thomson | May 26, 1896 |
| 1,933,798 | Gebers | Nov. 7, 1933 |
| 2,113,716 | Berliner | Apr. 12, 1938 |
| 2,366,200 | Langhorst | Jan. 2, 1945 |
| 2,400,954 | Salstrom | May 28, 1946 |